(12) United States Patent
Han et al.

(10) Patent No.: US 10,288,192 B2
(45) Date of Patent: May 14, 2019

(54) MINIATURE FLUID CONTROL DEVICE AND PIEZOELECTRIC ACTUATOR THEREOF

(71) Applicant: Microjet Technology Co., Ltd., Hsinchu (TW)

(72) Inventors: Yung-Lung Han, Hsinchu (TW); Chi-Feng Huang, Hsinchu (TW); Shih-Chang Chen, Hsinchu (TW); Jia-Yu Liao, Hsinchu (TW); Hung-Hsin Liao, Hsinchu (TW); Che-Wei Huang, Hsinchu (TW); Shou-Hung Chen, Hsinchu (TW)

(73) Assignee: MICROJET TECHNOLOGY CO., LTD., Hsinchu (TW)

(*) Notice: Subject to any disclaimer, the term of this patent is extended or adjusted under 35 U.S.C. 154(b) by 0 days.

(21) Appl. No.: 15/640,720

(22) Filed: Jul. 3, 2017

(65) Prior Publication Data

US 2018/0066768 A1  Mar. 8, 2018

(30) Foreign Application Priority Data

Sep. 5, 2016 (TW) .............................. 105128587 A

(51) Int. Cl.
*F16K 99/00* (2006.01)
*H02N 2/00* (2006.01)
*F04B 43/04* (2006.01)

(52) U.S. Cl.
CPC ........ *F16K 99/0048* (2013.01); *F04B 43/046* (2013.01); *H02N 2/001* (2013.01); *H02N 2/006* (2013.01)

(58) Field of Classification Search
CPC ... F04B 43/046; F04B 17/003; F16K 99/0048
See application file for complete search history.

(56) References Cited

U.S. PATENT DOCUMENTS

| 7,863,035 B2 * | 1/2011 | Clemens ................ G01N 27/27 417/322 |
| 7,972,124 B2 * | 7/2011 | Hirata ................. F04B 39/1093 417/413.2 |

(Continued)

FOREIGN PATENT DOCUMENTS

| CN | 203476669 U | 3/2014 |
| CN | 203488347 U | 3/2014 |

(Continued)

*Primary Examiner* — Matthew W Jellett
(74) *Attorney, Agent, or Firm* — Birch, Stewart, Kolasch & Birch, LLP

(57) ABSTRACT

A piezoelectric actuator includes a square suspension plate, an outer frame, plural brackets and a square piezoelectric ceramic plate. The outer frame is arranged around the suspension plate. A second surface of the outer frame and a second surface of the suspension plate are coplanar with each other. The plural brackets are perpendicularly connected between the suspension plate and the outer frame for elastically supporting the suspension plate. Each bracket has a length in a range between 1.11 mm and 1.21 mm and a width in a range between 0.2 mm and 0.6 mm. A length of the piezoelectric ceramic plate is not larger than a length of the suspension plate. The piezoelectric ceramic plate is attached on a first surface of the suspension plate.

20 Claims, 9 Drawing Sheets

(56) References Cited

U.S. PATENT DOCUMENTS

| | | | | |
|---|---|---|---|---|
| 8,157,549 | B2* | 4/2012 | Chen | B41J 2/17596 |
| | | | | 417/571 |
| 8,684,707 | B2* | 4/2014 | Kanai | F04B 45/047 |
| | | | | 417/410.2 |
| 2011/0076170 | A1* | 3/2011 | Fujisaki | F04B 45/047 |
| | | | | 417/415 |
| 2014/0377099 | A1* | 12/2014 | Hsueh | F04B 43/046 |
| | | | | 417/413.2 |
| 2015/0071797 | A1* | 3/2015 | Takeuchi | F04B 43/0054 |
| | | | | 417/413.2 |
| 2016/0076530 | A1 | 3/2016 | Chen et al. | |

FOREIGN PATENT DOCUMENTS

| | | |
|---|---|---|
| CN | 104234986 A | 12/2014 |
| CN | 105484982 A | 4/2016 |
| CN | 205383064 U | 7/2016 |
| EP | 2 568 175 A1 | 3/2013 |
| JP | 2012-210051 A | 10/2012 |
| JP | 2013-68215 A | 4/2013 |
| TW | 200909684 A | 3/2009 |
| TW | 201500670 A | 1/2015 |
| WO | WO 2005/067346 A1 | 7/2005 |

\* cited by examiner

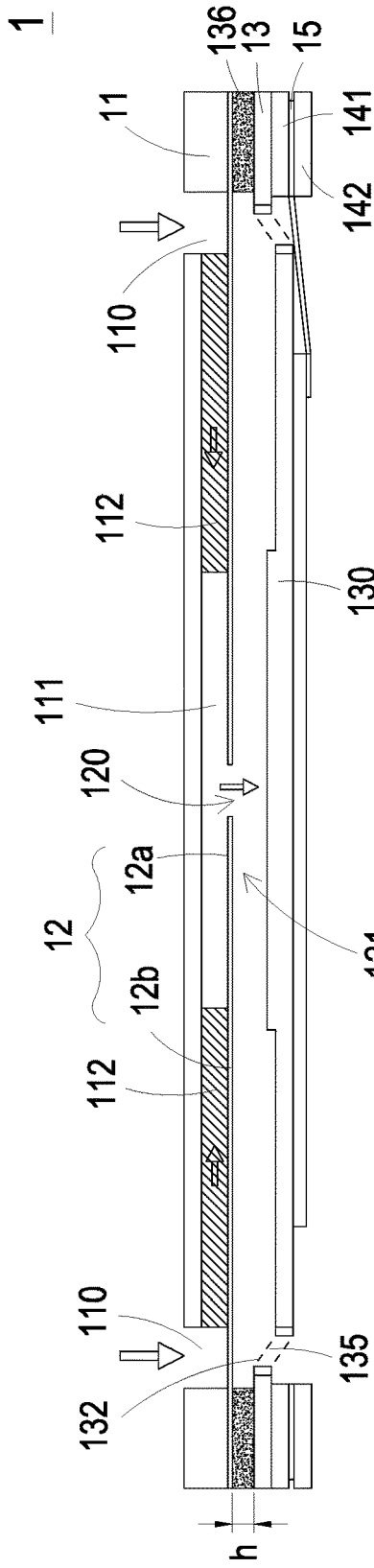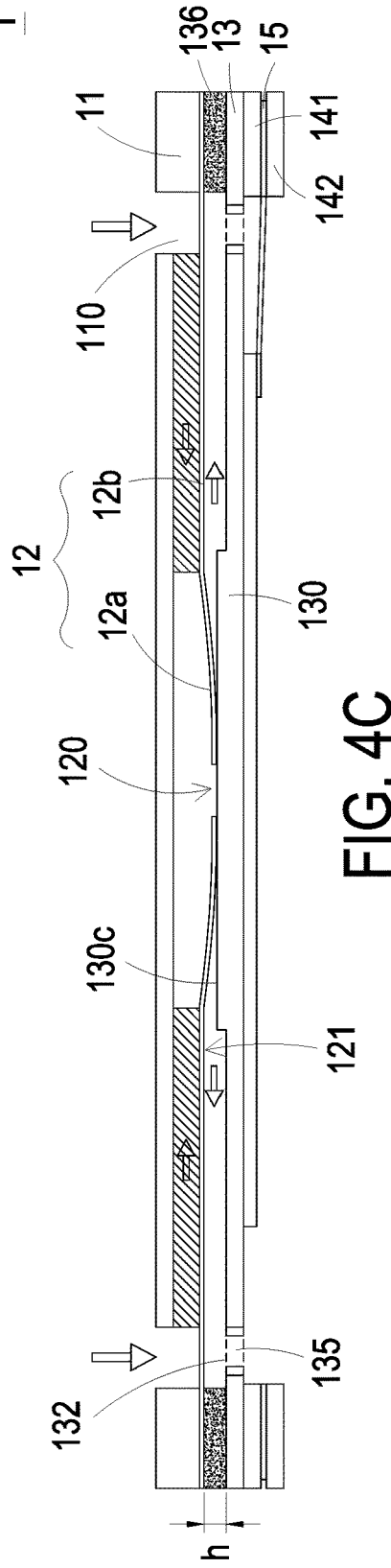

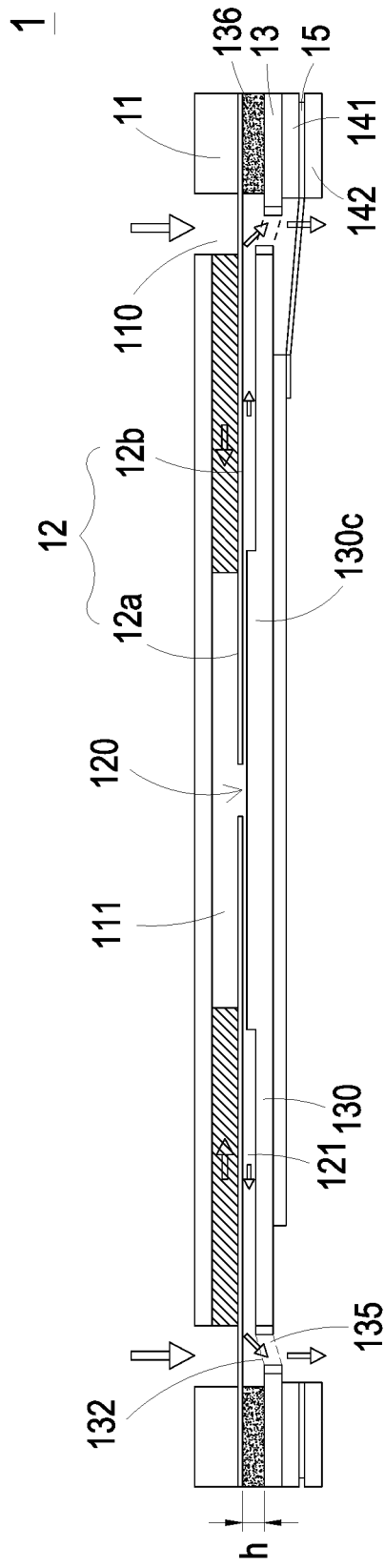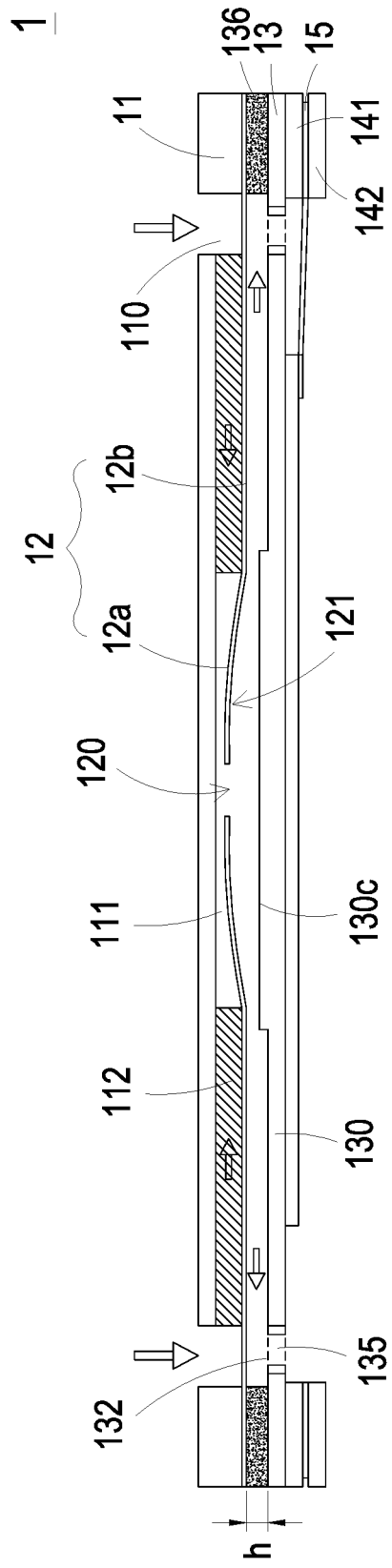

MINIATURE FLUID CONTROL DEVICE AND PIEZOELECTRIC ACTUATOR THEREOF

FIELD OF THE INVENTION

The present invention relates to a miniature fluid control device and a piezoelectric actuator, and more particularly to a slim and silent miniature fluid control device and a piezoelectric actuator thereof.

BACKGROUND OF THE INVENTION

With the advancement of science and technology, fluid control devices are widely used in many sectors such as pharmaceutical industries, computer techniques, printing industries or energy industries. Moreover, the fluid control devices are developed toward elaboration and miniaturization. The fluid control devices are important components that are used in for example micro pumps, micro atomizers, printheads or industrial printers for transporting fluid. Therefore, it is important to provide an improved structure of the fluid control device.

For example, in the pharmaceutical industries, pneumatic devices or pneumatic machines use motors or pressure valves to transfer gases. However, due to the volume limitations of the motors and the pressure valves, the pneumatic devices or the pneumatic machines are bulky in volume. In other words, the conventional pneumatic device fails to meet the miniaturization requirement and is not portable. Moreover, during operations of the motor or the pressure valve, annoying noise is readily generated. That is, the conventional pneumatic device is neither friendly nor comfortable to the user.

Therefore, there is a need of providing a miniature fluid control device with small, miniature, silent, portable and comfortable benefits and providing a piezoelectric actuator thereof in order to eliminate the above drawbacks.

SUMMARY OF THE INVENTION

An object of the present invention provides a piezoelectric actuator. The piezoelectric actuator comprises a suspension plate, an outer frame, four brackets and a piezoelectric ceramic plate. The brackets are perpendicularly connected between the suspension plate and the outer frame for elastically supporting the suspension plate. Such configuration can decrease the non-uniform motion such as deflecting waggling of the suspension plate, therefore increases the amplitude of the suspension plate along the Z axis, and enhances the stability and consistence of the motion of the suspension plate in the vertical direction during operation. As a result, the steadiness and performance of the piezoelectric actuator are intensified.

Another object of the present invention provides a miniature fluid control device for applying to a portable device or wearable device. The regions of a metal plate corresponding to a suspension plate, an outer frame and at least one bracket of a piezoelectric actuator are etched at the same etch depth, and thus the integral structure of the suspension plate, the outer frame and the at least one bracket is defined. Consequently, a second surface of the suspension plate, a second surface of the outer frame and a second surface of the bracket are coplanar with each other. In comparison with the conventional way using the multiple-step etching process, the process of forming the piezoelectric actuator of the present invention is simplified. In accordance with the present invention, an adhesive layer is inserted in the gap between a resonance plate and the outer frame. Since the outer frame after being etched has a rough surface, the adhesion between the adhesive layer and the outer frame is increased. Moreover, since the thickness of the outer frame decreases when compared with the outer frame of the conventional piezoelectric actuator, the thickness of the adhesive layer in the gap can be increased. The increase of the thickness of the adhesive layer enhances the coating uniformity of the adhesive layer, which decrease the assembling error of the suspension plate in the horizontal direction and improve the efficiency of utilizing the kinetic energy of the suspension plate in the vertical direction. Moreover, the increase of the thickness of the adhesive layer can assist in absorbing vibration energy and reduce noise. Due to the slim, silent and power-saving benefits, the miniature fluid control device of the present invention is suitably used in the wearable device.

A further object of the present invention provides a piezoelectric actuator of a miniature fluid control device. A suspension plate of the piezoelectric actuator is a square plate with a bulge. After an external fluid is introduced into an inlet of the gas inlet plate of a base, the fluid is guided to a central cavity through a convergence channel, and then the fluid is transferred to a compressible chamber between the resonance plate and the piezoelectric actuator through the central aperture of the resonance plate. Consequently, a pressure gradient is generated in the compressible chamber to facilitate the fluid to flow at a high speed. Since the flowrate is not reduced and no pressure loss is generated, the volume of the compressible chamber can be compressed more effectively.

In accordance with an aspect of the present invention, there is provided a piezoelectric actuator. The piezoelectric actuator includes a square suspension plate, an outer frame, plural brackets and a square piezoelectric ceramic plate. The square suspension plate has a middle portion and a periphery portion. The suspension plate is permitted to undergo a curvy vibration from the middle portion to the periphery portion. The outer frame is arranged around the suspension plate. The plural brackets are perpendicularly connected between the suspension plate and the outer frame for elastically supporting the suspension plate. Each bracket has a length in a range between 1.11 mm and 1.21 mm and a width in a range between 0.2 mm and 0.6 mm. A maximum length of the piezoelectric ceramic plate is not larger than a length of a side of the square shape of the suspension plate. The piezoelectric ceramic plate is attached on a first surface of the suspension plate. When a voltage is applied to the piezoelectric ceramic plate, the suspension plate is driven to undergo the curvy vibration.

In accordance with another aspect of the present invention, there is provided a miniature fluid control device. The miniature fluid control device includes a piezoelectric actuator and a housing. The piezoelectric actuator includes a suspension plate, an outer frame, at least one bracket and a piezoelectric ceramic plate. The suspension plate is a square plate having a first surface and a second surface. A bulge is formed on the second surface of the suspension plate. The outer frame is arranged around the suspension plate and has a first surface and a second surface. The suspension plate and the outer frame are connected with each other through the at least one bracket. The second surface of the outer frame and the second surface of the suspension plate are coplanar with each other. A length of the piezoelectric ceramic plate is not larger than a length of the suspension plate. The piezoelectric ceramic plate is attached on the first surface of the suspension plate. Moreover, each bracket has a length in a range between 1.11 mm and 1.21 mm and a width in a range between 0.2 mm and 0.6 mm. The housing includes a gas collecting plate and a base. The gas collecting plate is a frame body with a bottom plate and a sidewall structure extending from the peripheral of the bottom plate. An accommodation space is defined by the bottom plate and the sidewall structure collaboratively. The piezoelectric actuator is disposed within the accommodation space. The base includes a gas inlet plate and a resonance plate. The base is disposed within the accommodation space to seal the piezoelectric actuator. The gas inlet plate comprises at least one inlet, at least one convergence channel in communication with the inlet and a convergence chamber. The resonance plate is fixed on the gas inlet plate and has a central aperture corresponding to the convergence chamber of the gas inlet plate and the bulge of the suspension plate. An adhesive layer is arranged between the second surface of the outer frame of the piezoelectric actuator and the resonance plate. Consequently, a depth of a compressible chamber between the piezoelectric actuator and the resonance plate is maintained.

The above contents of the present invention will become more readily apparent to those ordinarily skilled in the art after reviewing the following detailed description and accompanying drawings, in which:

BRIEF DESCRIPTION OF THE DRAWINGS

FIGS. 4A to 4E schematically illustrate the actions of the miniature fluid control device of FIG. 1A.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a miniature fluid control device and a piezoelectric actuator thereof. The fluid control device can be used in many sectors such as pharmaceutical industries, energy industries computer techniques or printing industries for transporting fluids.

Figure 1A:
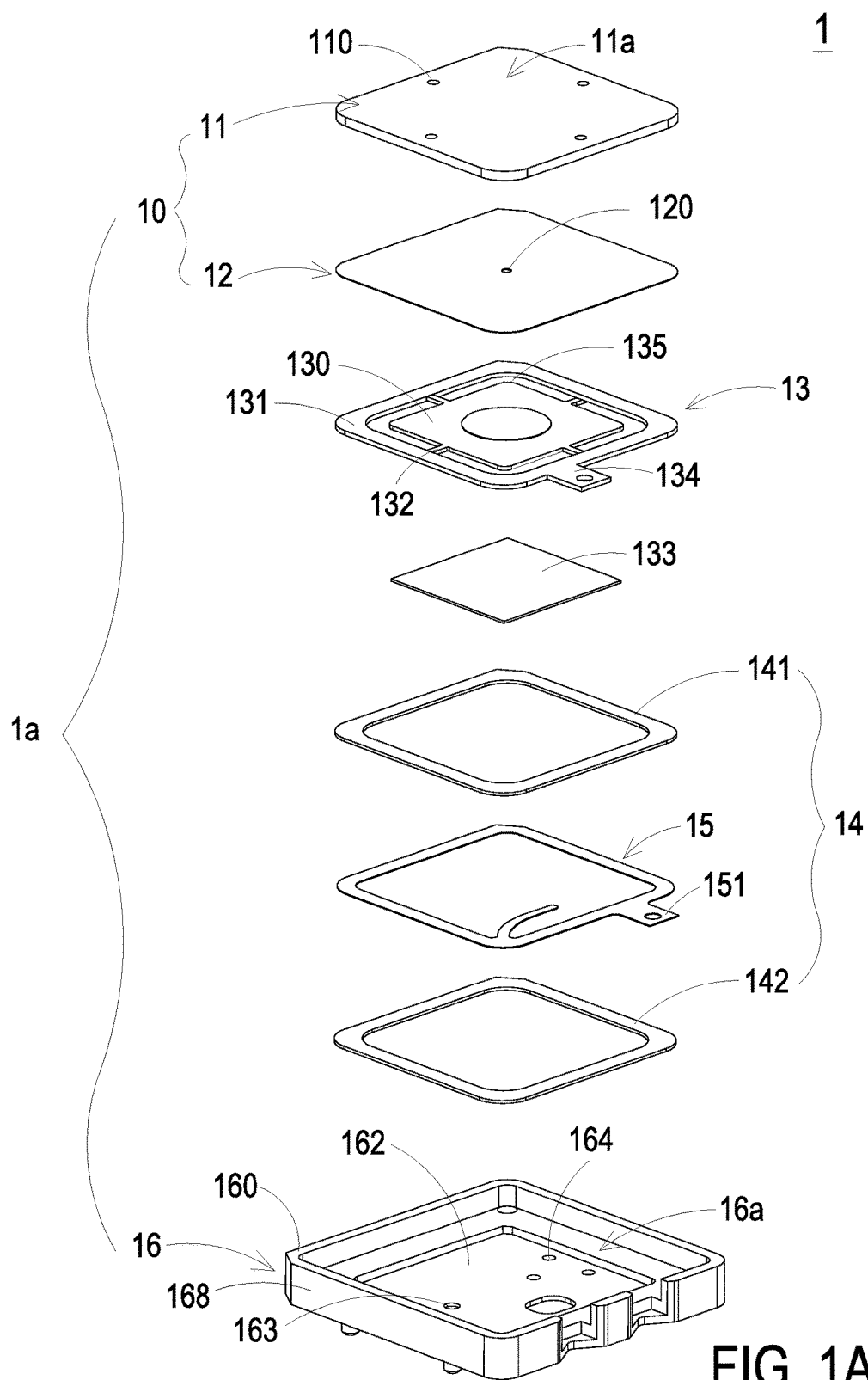
FIG. 1A is a schematic exploded view illustrating a miniature fluid control device according to an embodiment of the present invention and taken along a first viewpoint.
Figure 1B:
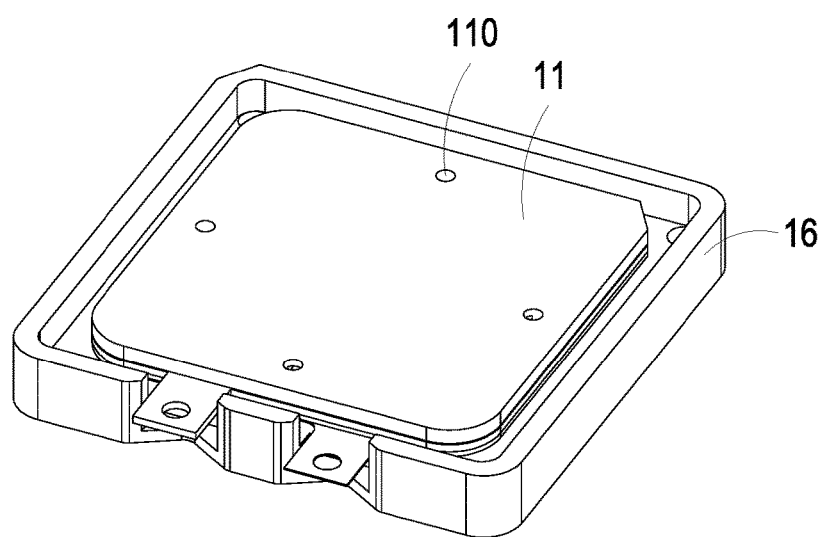
FIG. 1B is a schematic perspective view illustrating the assembled structure of the miniature fluid control device of FIG. 1A.
Figure 2A:
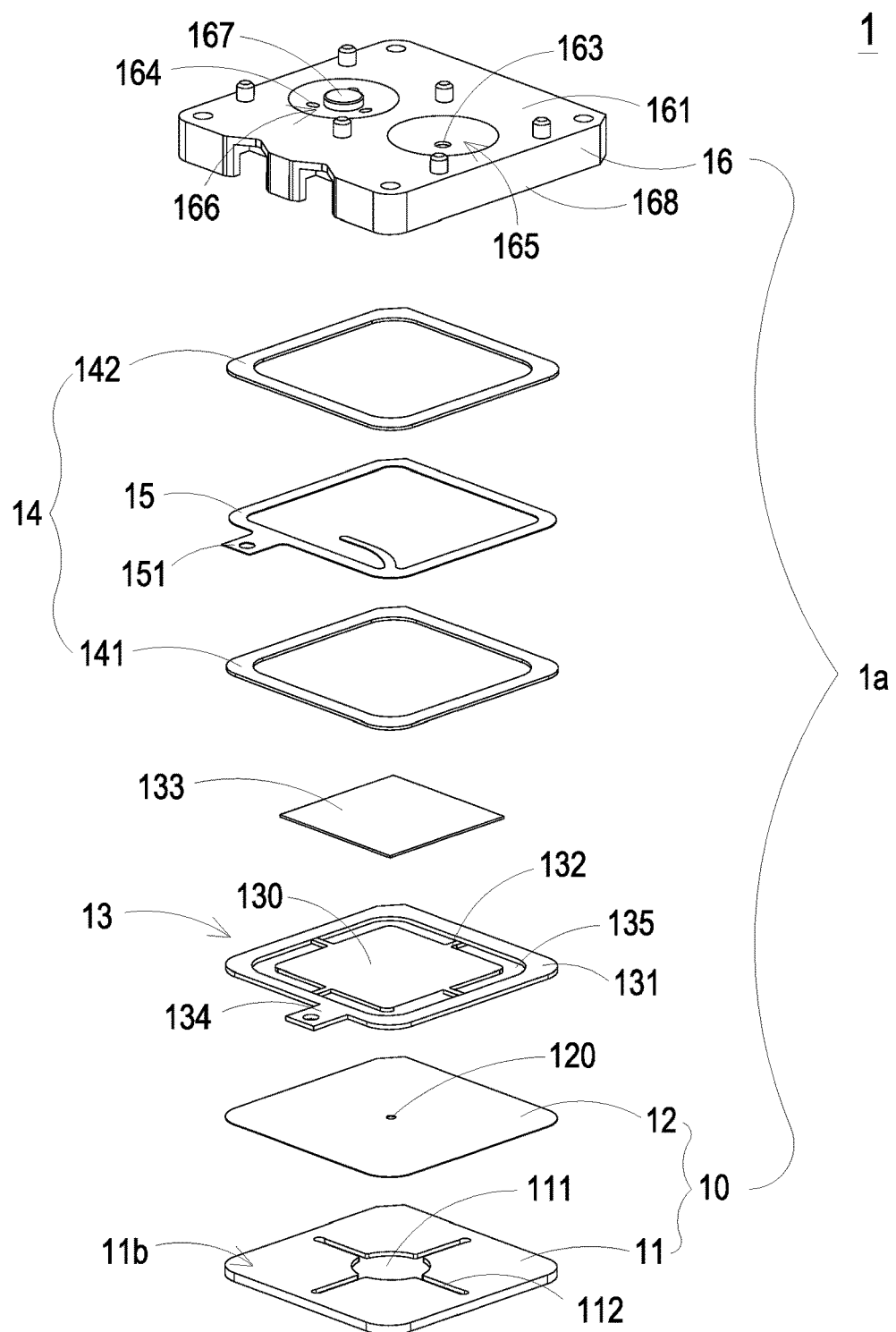
FIG. 2A is a schematic exploded view illustrating the miniature fluid control device of FIG. 1A and taken along a second viewpoint.
Figure 2B:
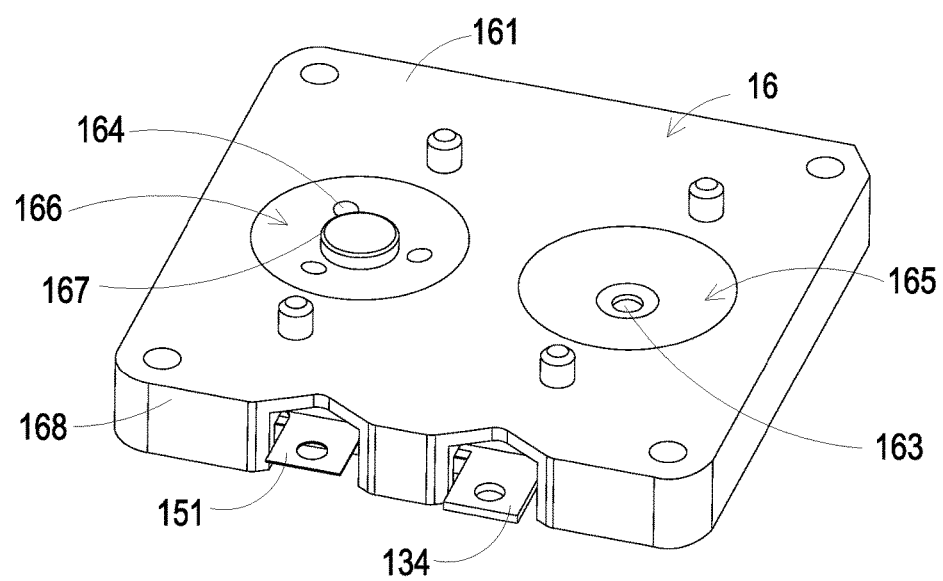
FIG. 2B is a schematic perspective view illustrating the assembled structure of the miniature fluid control device of FIG. 2A.
Figure 5:
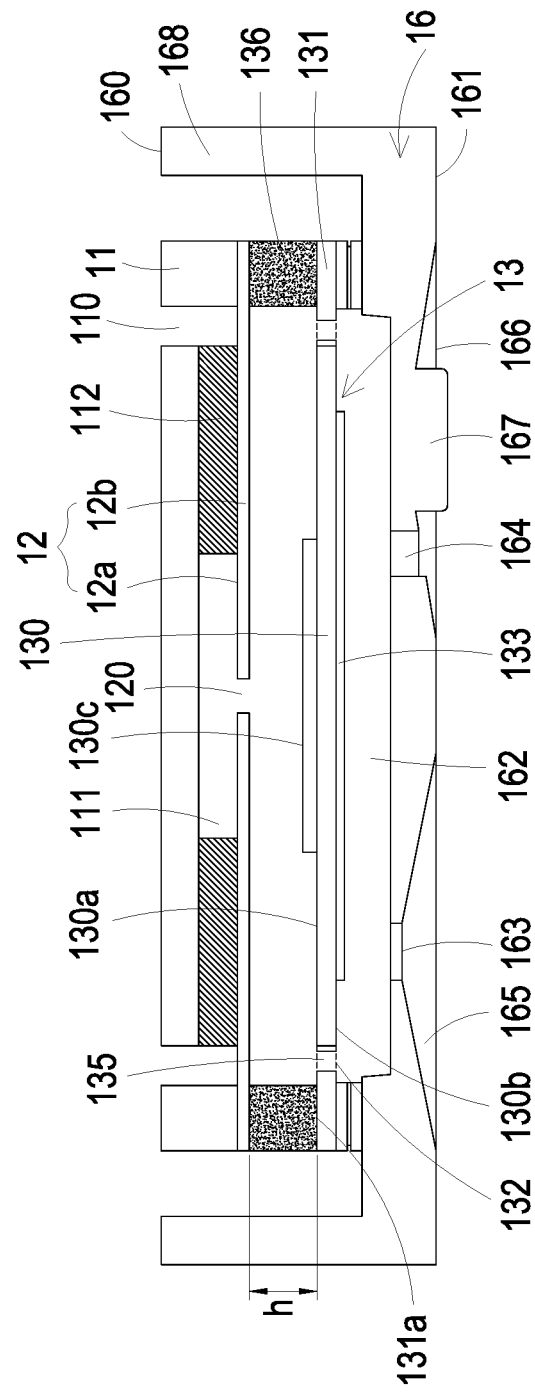
FIG. 5 is a schematic cross-sectional view illustrating the miniature fluid control device of FIG. 1B.

Please refer to FIGS. 1A, 1B, 2A, 2B and 5. FIG. 1A is a schematic exploded view illustrating a miniature fluid control device according to an embodiment of the present invention and taken along a first viewpoint. FIG. 1B is a schematic perspective view illustrating the assembled structure of the miniature fluid control device of FIG. 1A. FIG. 2A is a schematic exploded view illustrating the miniature fluid control device of FIG. 1A and taken along a second viewpoint. FIG. 2B is a schematic perspective view illustrating the assembled structure of the miniature fluid control device of FIG. 2A. FIG. 5 is a schematic cross-sectional view illustrating the miniature fluid control device of FIG. 1B.

As shown in FIGS. 1A, 2A and 5, the miniature fluid control device 1 comprises a housing 1a, a piezoelectric actuator 13, a first insulation plate 141, a conducting plate 15 and a second insulation plate 142. The housing 1a comprises a gas collecting plate 16 and a base 10. The base 10 comprises a gas inlet plate 11 and a resonance plate 12. The piezoelectric actuator 13 is aligned with the resonance plate 12. The gas inlet plate 11, the resonance plate 12, the piezoelectric actuator 13, the first insulation plate 141, the conducting plate 15, the second insulation plate 142 and the gas collecting plate 16 are stacked on each other sequentially. Moreover, the piezoelectric actuator 13 comprises a suspension plate 130, an outer frame 131, at least one bracket 132 and a piezoelectric ceramic plate 133.

As shown in FIG. 1A and FIG. 5, the gas collecting plate 16 is a frame body formed with a bottom plate and a sidewall structure 168. The sidewall structure 168 extending from the edges of the bottom plate. An accommodation space 16a is defined by the bottom plate and the sidewall structure 168 collaboratively, and the piezoelectric actuator 13 is disposed within the accommodation space 16a.

The gas collecting plate 16 comprises a first surface 160 and a second surface 161 (also referred as a fiducial surface). The first surface 160 of the gas collecting plate 16 is concaved to define a gas-collecting chamber 162. The fluid transferred downwardly by the miniature fluid control device 1 is temporarily accumulated in the gas-collecting chamber 162. The gas collecting plate 16 comprises a first perforation 163 and a second perforation 164. A first end of the first perforation 163 and a first end of the second perforation 164 are in communication with the gas-collecting chamber 162. A second end of the first perforation 163 communicates with a first pressure-releasing chamber 165, and a second end of the second perforation 164 communicates with a first outlet chamber 166, while the first pressure-releasing chamber 165 and the first outlet chamber 166 are formed on the second surface 161 of the gas collecting plate 16. Moreover, a raised structure 167 is disposed in the first outlet chamber 166, while the raised structure 167 includes but is not limited to a cylindrical post.

As shown in FIG. 2A, the piezoelectric actuator 13 comprises the suspension plate 130 having a square shape, the outer frame 131, four brackets 132 and the piezoelectric ceramic plate 133. In this embodiment, the piezoelectric ceramic plate 133 also has a square shape. Thus, a maximum length of the piezoelectric ceramic plate 133 is the length of a side of the square shape thereof. The maximum length of the piezoelectric ceramic plate 133 is equal to or less than the length of a side of the square shape of the suspension plate 130. Moreover, the piezoelectric ceramic plate 133 is attached on the suspension plate 130. In this embodiment, the suspension plate 130 is a flexible square plate structure.

The outer frame 131 is arranged around the suspension plate 130. The profile of the outer frame 131 substantially matches the profile of the suspension plate 130. That is, the outer frame 131 is a square hollow frame. Moreover, the four brackets 132 are connected between the suspension plate 130 and the outer frame 131 for elastically supporting the suspension plate 130.

Please refer to FIGS. 1A and 2A again. The miniature fluid control device 1 further comprises the first insulation plate 141, the conducting plate 15 and the second insulation plate 142. The conducting plate 15 is arranged between the first insulation plate 141 and the second insulation plate 142. For assembling the miniature fluid control device 1, the second insulation plate 142, the conducting plate 15, the first insulation plate 141, the piezoelectric actuator 13 and the base 10 are assembled together and accommodated within the accommodation space 16a of the gas collecting plate 16. The resulting structure of the miniature fluid control device 1 is shown in FIGS. 1B and 2B. Through such configuration, the miniature fluid control device 1 has a miniature profile.

Please refer to FIGS. 1A and 2A again. The gas inlet plate 11 of the miniature fluid control device 1 comprises a first surface 11b, a second surface 11a and at least one inlet 110. In this embodiment, the gas inlet plate 11 has four inlets 110. The inlets 110 run through the first surface 11b and the second surface 11a of the gas inlet plate 11. In response to the action of the atmospheric pressure, the fluid can be introduced into the miniature fluid control device 1 through the inlets 110. As shown in FIG. 2A, there are at least one convergence channel 112 formed on the first surface 11b of the gas inlet plate 11, while there are four convergence channels 112 in this embodiment. The at least one convergence channel 112 is in communication with the at least one inlet 110 on the second surface 11a of the gas inlet plate 11. In this embodiment, each of the convergence channels 112 is in communication with the respectively corresponding one of the inlets 110. Moreover, a central cavity 111 is formed on the first surface 11b of the gas inlet plate 11. The central cavity 111 is in communication with the at least one convergence channel 112. Furthermore, the central cavity 111 is formed on the central crossing of the convergence channels 112. After the fluid is introduced into the at least one convergence channel 112 through the at least one inlet 110, the fluid is guided to the central cavity 111. In this embodiment, the at least one inlet 110, the at least one convergence channel 112 and the central cavity 111 of the gas inlet plate 11 are integrally formed. After the gas inlet plate 11 and the resonance plate 12 are assembled, a convergence chamber for temporarily storing the fluid is formed between the central cavity 111 and the resonance plate 12. Preferably but not exclusively, the gas inlet plate 11 is made of stainless steel. The thickness of the gas inlet plate 11 is in the range between 0.4 mm and 0.6 mm, and preferably 0.5 mm. In addition, the depth of the convergence chamber defined by the central cavity 111 is equal to the depth of the at least one convergence channel 112.

Preferably but not exclusively, the resonance plate 12 is made of a flexible material. The resonance plate 12 comprises a central aperture 120 corresponding to the central cavity 111 of the gas inlet plate 11. Consequently, the fluid can be transferred through the central aperture 120. Preferably but not exclusively, the resonance plate 12 is made of copper. The thickness of the resonance plate 12 is in the range between 0.03 mm and 0.08 mm, and preferably 0.05 mm.

Figure 4A:
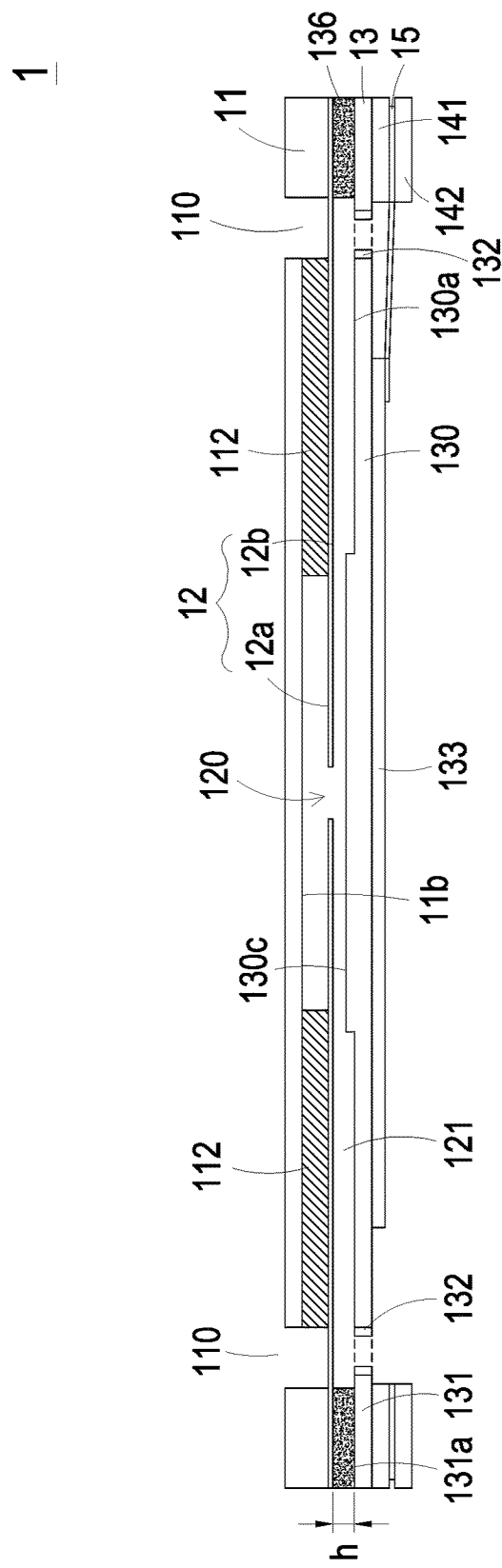

The schematic cross-sectional view of the miniature fluid control device 1 is shown in FIG. 4A. As shown in FIGS. 4A and 5, there is a gap h between the resonance plate 12 and the outer frame 131 of the piezoelectric actuator 13. An adhesive layer 136, which is preferably but not limited to a conductive adhesive, is inserted in the gap h. Consequently, the depth of the gap h between the resonance plate 12 and the suspension plate 130 can be maintained to guide the fluid to flow more quickly. Moreover, due to the depth of the gap h, a compressible chamber 121 is defined between the resonance plate 12 and the suspension plate 130. In consequence of guiding the fluid to enter the compressible chamber 121 via the central aperture 120 of the resonance plate 12, the fluid can flow at a faster speed. In addition, the proper distance between the resonance plate 12 and the suspension plate 130 diminishes the contact interference and largely reduces the generated noise.

Please refer to FIGS. 1A and 2A again. The miniature fluid control device 1 further comprises the first insulation plate 141, the conducting plate 15 and the second insulation plate 142. The first insulation plate 141, the conducting plate 15 and the second insulation plate 142 are stacked on each other sequentially, and arranged between the piezoelectric actuator 13 and the gas collecting plate 16. The profiles of the first insulation plate 141, the conducting plate 15 and the second insulation plate 142 substantially match the profile of the outer frame 131 of the piezoelectric actuator 13. The first insulation plate 141 and the second insulation plate 142 are made of an insulating material (e.g. a plastic material) for providing insulating efficacy. The conducting plate 15 is made of an electrically conductive material (e.g. a metallic material) for providing electrically conducting efficacy. Moreover, the conducting plate 15 has a conducting pin 151 so as to be electrically connected with an external circuit (not shown).

Figure 3A:
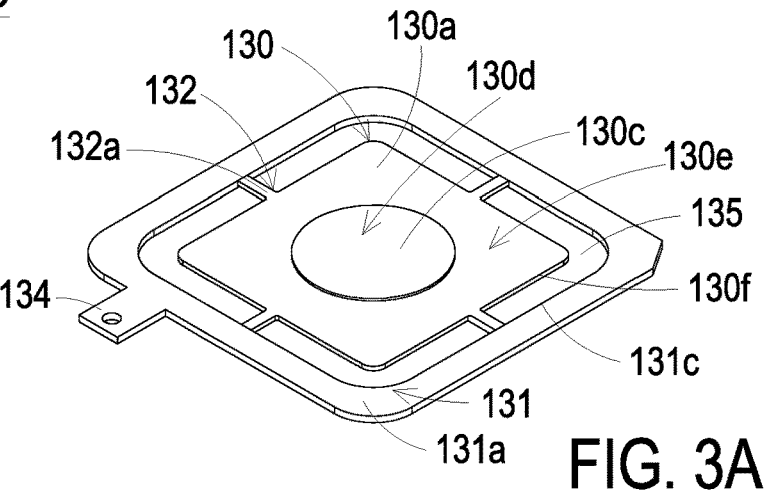
FIG. 3A is a schematic perspective view illustrating the piezoelectric actuator of the miniature fluid control device of FIG. 1A and taken along the front side.
Figure 3B:
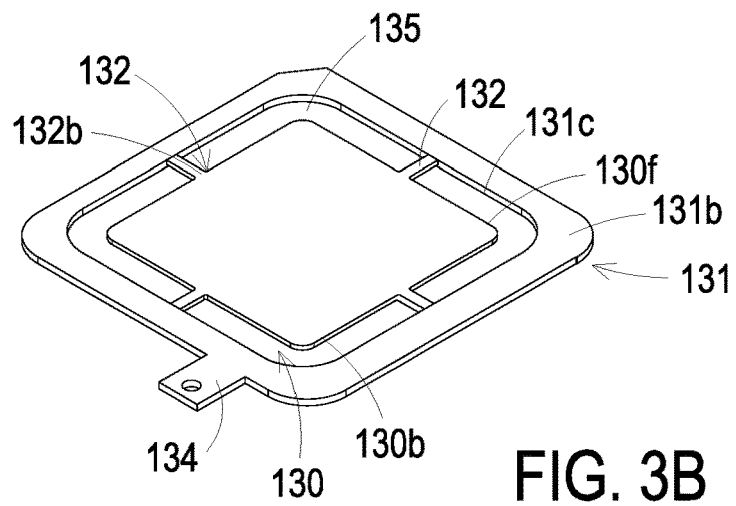
FIG. 3B is a schematic perspective view illustrating the piezoelectric actuator of the miniature fluid control device of FIG. 1A and taken along the rear side.
Figure 3C:
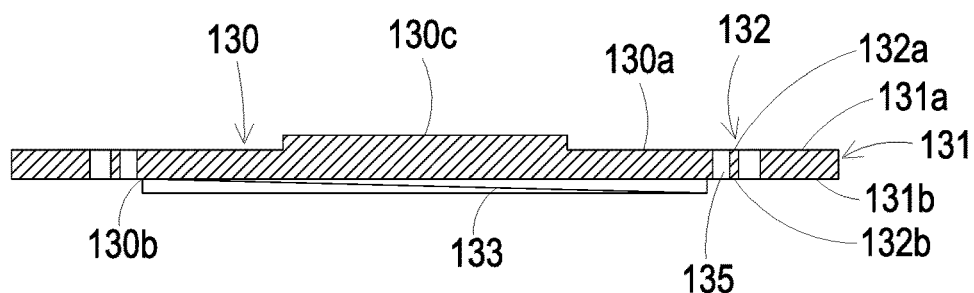
FIG. 3C is a schematic cross-sectional view illustrating the piezoelectric actuator of the miniature fluid control device of FIG. 1A.

FIG. 3A is a schematic perspective view illustrating the piezoelectric actuator of the miniature fluid control device of FIG. 1A and taken along the front side. FIG. 3B is a schematic perspective view illustrating the piezoelectric actuator of the miniature fluid control device of FIG. 1A and taken along the rear side. FIG. 3C is a schematic cross-sectional view illustrating the piezoelectric actuator of the miniature fluid control device of FIG. 1A. Referring to FIGS. 3A, 3B and 3C, the piezoelectric actuator 13 is assembled by the suspension plate 130, the outer frame 131, the four brackets 132, and the piezoelectric ceramic plate 133. In this embodiment, the suspension plate 130, the four brackets 132 and the outer frame 131 are integrally formed and produced by using a metal plate (e.g., a stainless steel plate). That is, the piezoelectric actuator 13 of the miniature fluid control device 1 is made by attaching the piezoelectric ceramic plate 133 to the processed metal plate. The suspension plate 130 comprises a first surface 130b and an opposite second surface 130a. The piezoelectric ceramic plate 133 is attached on the first surface 130b of the suspension plate 130. When a voltage is applied to the piezoelectric ceramic plate 133, the piezoelectric ceramic plate 133 drives the suspension plate 130 to a curvy vibration. As shown in FIG. 3A, the suspension plate 130 comprises a middle portion 130d and a periphery portion 130e. When the piezoelectric ceramic plate 133 is subjected to the curvy vibration, the suspension plat 130 is subjected to the curvy vibration from the middle portion 130d to the periphery portion 130e. The outer frame 131 is arranged around the peripheral of the suspension plate 130. Moreover, a conducting pin 134 protrudes outwardly from the outer frame 131 so as to be electrically connected with an external circuit (not shown).

The four brackets 132 are connected between the suspension plate 130 and the outer frame 131 for elastically supporting the suspension plat 130 wherein the four brackets 132 are perpendicular to the suspension plate 130 and the outer frame 131, as the lateral rim 130f of the suspension plate 130 and the corresponding inner rim 131c of the outer frame 131 are in parallel with each other. A first end of the bracket 132 is perpendicular to and connected with the corresponding lateral rim 130f of the suspension plate 130. A second end of the bracket 132 is perpendicular to and connected with the corresponding inner rim 131c of the outer frame 131. Moreover, at least one vacant space 135 is formed between the brackets 132, the suspension plate 130 and the outer frame 131 for allowing the fluid to go through. The types of the suspension plate 130 and the outer frame 131 and the type and the number of the brackets 132 may be varied according to the practical requirements. Since the brackets 132 are perpendicularly connected between the suspension plate 130 and the outer frame 131, the non-uniform motion such as deflecting waggling of the suspension plate 130 can be decreased, therefore increases the amplitude of the suspension plate 130 along the Z axis, and enhances the stability and consistence of the motion of the suspension plate 130 in the vertical direction during operation. As a result, the steadiness and performance of the piezoelectric actuator 13 are intensified.

The performance data of the miniature fluid control device with different dimensions of brackets are listed in Table 1.

TABLE 1

| Length of bracket | 1.01 mm | 1.06 mm | 1.11 mm | 1.16 mm | 1.21 mm | 1.26 mm |
|---|---|---|---|---|---|---|
| Width of bracket | 0.2 mm | 0.2 mm | 0.2 mm | 0.4 mm | 0.6 mm | 0.9 mm |
| Frequency | 30 kHz | 29 kHz | 29 kHz | 28 kHz | 26 kHz | 22 kHz |
| Maximum output pressure | 220 mm Hg | 220 mm Hg | 250 mm Hg | 350 mm Hg | 280 mm Hg | 250 mm Hg |

The results of the above table indicate that the brackets with the length in the range between 1.11 mm and 1.21 mm (preferably 1.16 mm) and the width in the range between 0.2 mm and 0.6 mm (preferably 0.4 mm) have better performance.

As shown in FIGS. 3A and 3C, the second surface 130a of the suspension plate 130 is coplanar with a second surface 131a of the outer frame 131 and a second surface 132a of the bracket 132. In this embodiment, the suspension plate 130 is a square plate structure. The length of the suspension plate 130 is in the range between 7.5 mm and 12 mm, and preferably in the range between 7.5 mm and 8.5 mm. The thickness of the suspension plate 130 is in the range between 0.1 mm and 0.4 mm, and preferably 0.27 mm. The thickness of the outer frame 131 is also in the range between 0.1 mm and 0.4 mm, while the optimum is 0.27 mm. Any of the lengths of the piezoelectric ceramic plate 133 is not larger than the length of the suspension plate 130. In this embodiment, the piezoelectric ceramic plate 133 is also a square plate structure to match the suspension plate 130. The thickness of the piezoelectric ceramic plate 133 is in the range between 0.05 mm and 0.3 mm, while the optimum is 0.10 mm.

As mentioned above, the suspension plate 130 of the piezoelectric actuator 13 of the present invention is a square suspension plate. In comparison with the circular suspension plate of the conventional piezoelectric actuator, the square suspension plate is more power-saving. The comparison between the consumed power and the operating frequency for the suspension plates of different types and sizes is shown in Table 2.

TABLE 2

| Type and size of suspension plate | Operating frequency | Consumed power |
|---|---|---|
| Square (side length: 10 mm) | 18 kHz | 1.1 W |
| Circular (diameter: 10 mm) | 28 kHz | 1.5 W |
| Square (side length: 9 mm) | 22 kHz | 1.3 W |
| Circular (diameter: 9 mm) | 34 kHz | 2 W |
| Square (side length: 8 mm) | 27 kHz | 1.5 W |
| Circular (diameter: 8 mm) | 42 kHz | 2.5 W |

From the results of Table 2, it is found that the piezoelectric actuator with the square suspension plate (8 mm~10 mm) is more power-saving than the piezoelectric actuator with the circular suspension plate (8 mm~10 mm). That is, the piezoelectric actuator with the square suspension plate consumes less power. Generally, the consumed power of the capacitive load at the resonance frequency is positively related to the resonance frequency. Since the resonance frequency of the square suspension plate is obviously lower than that of the circular square suspension plate, the consumed power of the square suspension plate is fewer. Due to the slim, silent and power-saving benefits, the miniature fluid control device 1 of the present invention is suitably used in the wearable device.

As mentioned above, the suspension plate 130, the outer frame 131 and the four brackets 132 are integrally formed with each other. Moreover, the suspension plate 130, the outer frame 131 and the four brackets 132 can be produced by one of the following means including but not limited to a conventional machining process, a photolithography and etching process, a laser machining process, an electroforming process, an electric discharge machining process and so on. In this embodiment, the certain regions of a metal plate respectively corresponding to the suspension plate 130, the outer frame 131 and the four brackets 132 are etched at the same etch depth, such that the integral structure of suspension plate 130, the outer frame 131 and the four brackets 132 is defined. Consequently, the second surface 130a of the suspension plate 130, the second surface 131a of the outer frame 131 and the second surfaces 132a of the brackets 132 are coplanar with each other. As known, the conventional piezoelectric actuator needs to be etched in multiple steps in order to make different depths for forming the outer frame and the suspension plate. In accordance with the present invention, the adhesive layer 136 is inserted in the gap between the resonance plate 12 and the outer frame 131. Since the outer frame 131 after being etched has a rough surface, the adhesion between the adhesive layer 136 and the outer frame 131 is increased. Moreover, since the thickness of the outer frame 131 lesser than the outer frame of the conventional piezoelectric actuator, the thickness of the adhesive layer 136 in the gap h can be increased. The increase of the thickness of the adhesive layer 136 can enhance the coating uniformity of the adhesive layer 136, reduce the assembling error of the suspension plate 130 in the horizontal direction, and improve the efficiency of utilizing the kinetic energy of the suspension plate 130 in the vertical direction. Moreover, the increase of the thickness of the adhesive layer 136 can assist in absorbing vibration energy and reduce noise.

The performance data of the miniature fluid control device with different thicknesses of adhesive layers are listed in Table 3.

TABLE 3

| | Adhesive thickness | | | | | | |
|---|---|---|---|---|---|---|---|
| | 40 μm | 45 μm | 50 μm | 55 μm | 60 μm | 65 μm | 70 μm |
| Frequency | 28 kHz | 28 kHz | 28 kHz | 28 kHz | 28 kHz | 28 kHz | 28 kHz |
| Maximum output pressure | 50 mm Hg | 150 mm Hg | 275 mm Hg | 350 mm Hg | 290 mm Hg | 265 mm Hg | 145 mm Hg |
| Defect rate | 12/25 = 48% | 9/25 = 36% | 3/25 = 12% | 1/25 = 4% | 2/25 = 8% | 10/25 = 40% | 10/25 = 40% |

It is found that the performance of the miniature fluid control device is highly influenced by the thickness of the adhesive layer 136. If the thickness of the adhesive layer 136 is too large, although the depth of the gap h can be larger, the expansion of the compressible chamber 121 deteriorates its compressible efficacy and thus reduces the performance of the miniature fluid control device 1. If the thickness of the adhesive layer 136 is too small, the depth of the gap h is insufficient that the bulge 130c and the resonance plate 12 may collide with each other. Such collision reduces the performance and generates noise, while the noise problem may result in the defectiveness of the products. The results of the above table are obtained by testing 25 samples of the miniature fluid control device 1 with specified thicknesses of adhesive layer 136. The optimized thickness of the adhesive layer 136 is in the range between 50 μm and 60 μm. In this thickness range, the performance is largely increased, and the defect rate is reduced. More preferably, the optimum thickness of the adhesive layer 136 is 55 μm because the performance is the best and the defect rate is the minimum under this size of the adhesive layer 136.

As shown in FIG. 3C, the suspension plate 130 is a stepped structure, having a bulge 130c formed on the middle portion 130d of the second surface 130a. The bulge 130c is but not limited to be a circular convex structure. The thickness of the bulge 130c is in the range between 0.02 mm and 0.08 mm, and preferably 0.03 mm. Preferably but not exclusively, the diameter of the bulge 130c is 4.4 mm.

FIGS. 4A to 4E schematically illustrate the actions of the miniature fluid control device of FIG. 1A. Please refer to FIGS. 1A, 4A to 4E and 5. As the base 10, the gas inlet plate 11, the resonance plate 12, the piezoelectric actuator 13, the first insulation plate 141, the conducting plate 15 the second insulation plate 142 and the gas collecting plate 16 have been assembled, a convergence chamber is formed between the resonance plate 12 and the central cavity 111 on the first surface 11b of the gas inlet plate 11, while the compressible chamber 121 is formed between the resonance plate 12 and the suspension plate 130 for temporarily storing the fluid. The compressible chamber 121 is in communication with the convergence chamber 111 through the central aperture 120 of the resonance plate 12. When the piezoelectric actuator 13 is actuated by an applied voltage, the suspension plate 130 of the piezoelectric actuator 13 is vibrated along a vertical direction in a reciprocating manner. The related actions of the miniature fluid control device 1 will be described as follows.

Please refer to FIG. 4B. In the process of the reciprocating vibration of the suspension plate 130 of the piezoelectric actuator 13, when the piezoelectric actuator 13 is vibrating downwardly, the fluid is fed into the at least one inlet 110 of the gas inlet plate 11, and then transferred to the central cavity 111 of the gas inlet plate 11 through the at least one convergence channel 112. Since the resonance plate 12 is light and thin, the resonance plate 12 is pushed by the entering fluid and vibrates along the vertical direction in the reciprocating manner because of the resonance of the suspension plate 130. Under this circumstance, a movable part 12a of the resonance plate 12 corresponding to the central cavity 111 of the gas inlet plate 11 will be subjected to a curvy deformation.

Please refer to FIG. 4C. In the process of the reciprocating vibration of the suspension plate 130, the movable part 12a of the resonance plate 12 is vibrated downwardly to a position that is very close to the bulge 130c of the suspension plate 130, such that the fluid is introduced into the compressible chamber 121. As the region of the resonance plate 12 excluding the movable part 12a, which is also referred as a fixed part 12b, stands still while the movable part 12a is vibrating, the gap between the suspension plate 130 and the fixed part 12b remains an original height which allows the flow rate of the fluid not being reduced. Since no pressure loss is generated, the volume of the compressible chamber 121 can be compressed more effectively.

As shown in FIG. 4D, the piezoelectric actuator 13 keeps vibrating and when it moves upwardly, the fluid is pushed outwardly toward peripheral regions of the compressible chamber 121, and transferred downwardly through the vacant space 135 of the piezoelectric actuator 13 at a pressure higher than the former existing one in the compressible chamber 121.

As shown in FIG. 4E, the movable part 12a of the resonance plate 12 moves upwardly as a resonant motion in response to the upwardly action of the bulge 130c of the suspension plate 130 shown in the former figure. The volume of the convergence chamber reduces such that less fluid flows from the convergence channel 112 to the central cavity 111.

In the process of reciprocating vibration of the piezoelectric actuator 13, above-mentioned actions depicted from FIG. 4A to FIG. 4B are repeated. Since the suspension plate 130 of the piezoelectric actuator 13 has the bulge 130c, the efficiency of transferring the fluid is enhanced. It is noted that the profile, number and position of the bulge 130c may be varied according to the practical requirements.

In some embodiments, the vibration frequency of the resonance plate 12 in the vertical direction is identical to the vibration frequency of the piezoelectric actuator 13. That is, the resonance plate 12 and the piezoelectric actuator 13 are vibrated simultaneously, moving upwardly or downwardly at the same time. It is noted that the actions of the resonance plate 12 and the piezoelectric actuator 13 may be varied according to the practical requirements.

From the above descriptions, the present invention provides the miniature fluid control device and the piezoelectric actuator. The miniature fluid control device comprises the housing and the piezoelectric actuator. The piezoelectric actuator comprises a suspension plate, an outer frame, four brackets and a piezoelectric ceramic plate. The brackets are perpendicularly connected between the suspension plate and the outer frame for elastically supporting the suspension plate. Such configuration can decrease the non-uniform motion such as deflecting waggling of the suspension plate, therefore increases the amplitude of the suspension plate along the Z axis, and enhances the stability and consistence of the motion of the suspension plate in the vertical direction during operation. As a result, the steadiness and performance of the piezoelectric actuator are intensified.

Moreover, the regions of a metal plate corresponding to the suspension plate, the outer frame and the at least one bracket are etched at the same etch depth, and thus the integral structure of suspension plate, the outer frame and the at least one bracket is defined. Consequently, the second surface of the suspension plate, the second surface of the outer frame and the second surface of the bracket are coplanar with each other. In comparison with the conventional technology of using the multiple-step etching process for components in different depths, the process of forming the piezoelectric actuator of the present invention is simplified. In accordance with the present invention, the adhesive layer is inserted in the gap between the resonance plate and the outer frame. Since the outer frame after being etched has a rough surface, the adhesion between the adhesive layer and the outer frame is increased. Moreover, since the thickness of the outer frame is decreased when compared with the outer frame of the conventional piezoelectric actuator, the thickness of the adhesive layer in the gap can be increased. The increase of the thickness of the adhesive layer means that the coating uniformity of the adhesive layer is enhanced. Consequently, the assembling error of the suspension plate in the horizontal direction is decreased, and the kinetic energy of the suspension plate in the vertical direction is effectively utilized. Moreover, the increase of the thickness of the adhesive layer can assist in absorbing vibration energy and reduce noise. Since the miniature fluid control device is small and miniature, the miniature fluid control device is comfortable and portable.

Moreover, suspension plate of the piezoelectric actuator is a square plate with the bulge. After the fluid is introduced into the inlet of the gas inlet plate of the base, the fluid is guided to the central cavity through the convergence channel, and then the fluid is transferred to the compressible chamber between the resonance plate and the piezoelectric actuator through the central aperture of the resonance plate. Consequently, a pressure gradient is generated in the compressible chamber to facilitate the fluid to flow at a high speed. Since the flow rate is not reduced and no pressure loss is generated, the volume of the compressible chamber can be compressed more effectively. Due to the slim, silent and power-saving benefits, the miniature fluid control device of the present invention is suitably used in the wearable device. In other words, the miniature fluid control device of the present invention has significant industrial values.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A piezoelectric actuator, comprising:
   a suspension plate having a square shape and with a middle portion and a periphery portion, wherein the suspension plate is permitted to undergo a curvy vibration from the middle portion to the periphery portion;
   an outer frame arranged around the suspension plate;
   plural brackets perpendicularly connected between the suspension plate and the outer frame for elastically supporting the suspension plate, wherein each bracket has a length in a range between 1.11 mm and 1.21 mm and a width in a range between 0.2 mm and 0.6 mm; and
   a piezoelectric ceramic plate having a square shape, wherein a length of a side of the square shape of the piezoelectric ceramic plate is equal to or less than a length of a side of the square shape of the suspension plate, and the piezoelectric ceramic plate is attached on a first surface of the suspension plate, wherein when a voltage is applied to the piezoelectric ceramic plate, the suspension plate is driven to undergo the curvy vibration.

2. The piezoelectric actuator according to claim 1, wherein the plural brackets are four brackets.

3. The piezoelectric actuator according to claim 1, wherein a first end of each bracket is perpendicular to and connected with a lateral rim of the suspension plate, and a second end of the bracket is perpendicular to and connected with an inner rim of the outer frame.

4. The piezoelectric actuator according to claim 1, wherein the length of each bracket is 1.16 mm.

5. The piezoelectric actuator according to claim 1, wherein the width of each bracket is 0.4 mm.

6. The piezoelectric actuator according to claim 1, wherein a thickness of the piezoelectric ceramic plate is in a range between 0.05 mm and 0.3 mm.

7. The piezoelectric actuator according to claim 6, wherein the thickness of the piezoelectric ceramic plate is 0.10 mm.

8. The piezoelectric actuator according to claim 1, wherein a length of the suspension plate is in a range between 7.5 mm and 12 mm, and a thickness of the suspension plate is in a range between 0.1 mm and 0.4 mm.

9. The piezoelectric actuator according to claim 8, wherein the length of the suspension plate is in a range between 7.5 mm and 8.5 mm, and the thickness of the suspension plate is 0.27 mm.

10. A miniature fluid control device, comprising:
    a piezoelectric actuator comprising a suspension plate, an outer frame, four brackets and a piezoelectric ceramic plate, wherein the suspension plate has a square shape and has a first surface and an opposing second surface, a bulge is formed on the second surface of the suspension plate, the outer frame is arranged around the suspension plate and has a first surface and an opposing second surface, and the suspension plate and the outer frame are connected with each other through the brackets, wherein the second surface of the outer frame and the second surface of the suspension plate are coplanar with each other, a maximum length of the piezoelectric ceramic plate is equal to or less than a length of a side of the square shape of the suspension plate, and the piezoelectric ceramic plate is attached on the first surface of the suspension plate, wherein each bracket has a length in a range between 1.11 mm and 1.21 mm and a width in a range between 0.2 mm and 0.6 mm; and a housing comprising a gas collecting plate and a base, wherein the gas collecting plate is a frame body having a bottom plate and a sidewall structure to form an accommodation space, and the piezoelectric actuator is disposed within the accommodation space, wherein the base comprises a gas inlet plate and a resonance plate, and the base is disposed within the accommodation space to seal the piezoelectric actuator, wherein the gas inlet plate comprises at least one inlet, at least one convergence channel and a convergence chamber, wherein the resonance plate is fixed on the gas inlet plate and has a central aperture corresponding to the convergence chamber of the gas inlet plate and the bulge of the suspension plate, wherein an adhesive layer is arranged between the second surface of the outer frame of the piezoelectric actuator and the resonance plate, so that a depth of a compressible chamber between the piezoelectric actuator and the resonance plate is maintained.

11. The miniature fluid control device according to claim 10, wherein the length of each bracket is 1.16 mm.

12. The miniature fluid control device according to claim 10, wherein the width of each bracket is 0.4 mm.

13. The miniature fluid control device according to claim 10, wherein a thickness of the piezoelectric ceramic plate is in a range between 0.05 mm and 0.3 mm.

14. The miniature fluid control device according to claim 10, wherein a length of the suspension plate is in a range between 7.5 mm and 12 mm, and a thickness of the suspension plate is in a range between 0.1 mm and 0.4 mm.

15. The miniature fluid control device according to claim 14, wherein the length of the suspension plate is in a range between 7.5 mm and 8.5 mm, and the thickness of the suspension plate is 0.27 mm.

16. The miniature fluid control device according to claim 10, wherein a thickness of the adhesive layer is in a range between 50 µm and 60 µm.

17. The miniature fluid control device according to claim 16, wherein the thickness of the adhesive layer is 55 µm.

18. The miniature fluid control device according to claim 10, wherein a thickness of the bulge is in a range between 0.02 mm and 0.08 mm.

19. The miniature fluid control device according to claim 10, wherein the bulge on the suspension plate is a circular convex structure, and a diameter of the bulge is 4.4 mm.

20. The miniature fluid control device according to claim 10, wherein the regions of a metal plate corresponding to the suspension plate, the outer frame and the four brackets are etched at the same etch depth, so that the second surface of the outer frame and the second surface of the suspension plate are coplanar with each other.

* * * * *